United States Patent [19]
Schorn

[11] Patent Number: 6,015,171
[45] Date of Patent: Jan. 18, 2000

[54] RELEASABLE COUPLING MEANS FOR CONNECTING TWO TUBULAR ELEMENTS

[75] Inventor: Franz Schorn, Schiltach, Germany

[73] Assignee: Hans Grohe GmbH & Co. KG, Schiltach, Germany

[21] Appl. No.: 08/928,937

[22] Filed: Sep. 12, 1997

[30] Foreign Application Priority Data

Sep. 12, 1996 [DE] Germany .................. 196 37 074

[51] Int. Cl.[7] .................................................. F16L 17/00
[52] U.S. Cl. ..................... 285/362; 285/377; 251/148
[58] Field of Search ............... 138/46; 251/148; 285/360, 361, 362, 377, 396, 402

[56] References Cited

U.S. PATENT DOCUMENTS

| | | | |
|---|---|---|---|
| 1,148,824 | 8/1915 | Boje, Jr. ................... | 285/362 |
| 1,910,152 | 5/1933 | Durfey ...................... | 285/362 |
| 2,076,918 | 4/1937 | Robison ................. | 285/396 X |
| 2,889,158 | 6/1959 | Hughes-Caley ............ | 285/362 X |
| 3,470,524 | 9/1969 | Culver .................. | 285/362 X |
| 3,583,731 | 6/1971 | Jewell .................. | 285/362 X |
| 5,407,175 | 4/1995 | Roberts et al. .......... | 251/148 |

FOREIGN PATENT DOCUMENTS

| | | | |
|---|---|---|---|
| 2658899 | 8/1991 | France . | |
| 35686 | 9/1922 | Norway .................. | 251/148 |

*Primary Examiner*—Eileen Dunn Lillis
*Assistant Examiner*—Greg Binda
*Attorney, Agent, or Firm*—Duane, Morris & Heckscher LLP

[57] ABSTRACT

A coupling means for connecting two water-handling parts, more particularly rigid or flexible tubular elements, comprises a nipple element, a bush element and a coupling element. The coupling element is arranged on the nipple element or the bush element and movable relative thereto. For assembling the coupling means the nipple element is introduced linearly into the bush element, the coupling element moving by itself into the release position against the force of a spring. As soon as the nipple element is completely inserted, the spring forces the coupling element into a latched position in which the coupling is completed. In this latched position the coupling element can be turned further for adjusting an additional means.

14 Claims, 2 Drawing Sheets

RELEASABLE COUPLING MEANS FOR CONNECTING TWO TUBULAR ELEMENTS

TECHNICAL FIELD AND BACKGROUND OF THE INVENTION

The invention is based on a coupling means for connecting two rigid or flexible tubular elements through which water flows. More particularly, the invention relates to connecting two water-handling sanitary elements.

For connecting two such elements, for example a flexible tube and a hand shower, screw connections are known. For this purpose a union nut arranged at the end of the flexible tube is screwed onto the male thread of the hand shower.

Likewise known are bayonet connectors in which a nipple is initially introduced linearly into a bush and then turned at right angles to the linear movement of introduction. Accordingly, the user needs to implement two movements distinctly separate from each other to make the connection. In the coupled condition the nipple features a changed rotary position relative to the handle of the hand shower.

Plug-in couplings are likewise known in which for latching purposes a slider is movable perpendicular to the axis of the two parts to be joined together. The slider is typically urged into the latched position by a spring which may be formed as part of the slider. In this latched position the spring is still tensioned.

SUMMARY OF THE INVENTION

The invention is based on the object of providing a coupling means for connecting two rigid or flexible tubular elements which is simply configured and simple to operate.

To achieve this object the invention proposes a coupling means comprising a nipple element assigned to one of the two rigid or flexible tubular elements, a bush element assigned respectively to the other rigid or flexible tubular element and an internal opening configured to receive the nipple element as well as comprising a coupling element arranged on the nipple element or the bush element, the nipple element being inserted into the bush element preventing uncoupling of the two elements by cooperation with a coupling mating element at the respective other element and being movable into a release position against an urging force. Further aspects of the invention are the subject matters of the sub-claims.

The invention provides a coupling means of simple configuration which is very simple to operate and features further useful advantages.

The nipple element may be screwed to, for example, one end of the flexible or rigid tube or directly connected thereto.

The bush element may be, for example, the end of a shower handle, whereby an inverse arrangement or configuration is just as possible, of course. The coupling element is arranged on the nipple element or the bush element, whilst the mating element is fitted to the other element in each case.

In one aspect of the invention it may be provided for that the coupling element is arranged rotary about the common axis of coupling nipple element and coupling bush element. In this arrangement the visible aspect afforded by the rotary movement in the case of rigid or flexible tubular elements is combined with the linear plug-in movement.

Due to the linear movement proposed by the invention the nipple element can be introduced very simply into the bush element so that even a user having no practice in the matter is confronted with no difficulties.

In accordance with the invention the coupling element may be spring-loaded, whereby both a separate spring and a springy configuration of the one part of the coupling element may be employed.

In accordance with the invention it may be provided for that the coupling mating element comprises several ratchet teeth formed distributed about the circumference, more particularly in a fixed or internal arrangement. These ratchet teeth may cooperate with the coupling element such that in the coupled condition the coupling element engages the rear side of the ratchet teeth.

More particularly it may be provided for that the other element in each case comprises guiding grooves for the ratchet teeth, as a result of which the linear insertion movement of the nipple into the bush is supported and guided. When several grooves and several ratchet teeth exist the nipple may be introduced into several positions, where necessary.

In accordance with the invention it may be provided for that the coupling element and/or the mating element are configured such that on introducing the nipple element into the bush element the coupling element is moved into the release position. More particularly, this configuration may be provided on the ratchet teeth which may feature a wedge shape at least in part, for example.

The invention proposes that in its latched position in which it prevents the nipple element from being removed from the bush element the coupling element can be adjusted even further in the same direction of actuation. Thus, whilst, to produce the latching action from the release position, for example, a minor rotation of just a few angular degrees may be sufficient, the coupling element may be further turned significantly in the same direction of rotation, for example by just 90°. This further movement may be utilized for undertaking additional actuations.

More particularly it may be provided for that the coupling element is provided with an actuating element, for example, an actuator button to be fingered by the user to adjust the coupling element, the remaining part of the coupling element then not being accessible from without.

In accordance with the invention it may be provided for that the coupling element is in connection with an additional element of the coupling nipple element or coupling bush element or may be caused to connect in producing the coupling. In this case the actuating element may be actuated by further adjustment of the coupling element as soon as the coupling element latches the coupling in place. In this further range of adjustment the coupling element thus additionally acts as the adjusting element. In this arrangement actuation may be done with the same actuator button as is actuated also for producing or cancelling the latching action.

The actuating element may be, for example, a flow restrictor which may be incorporated in the coupling nipple. The flow restrictor may be adjusted, for example, by it being turned about the axis of the nipple, an actuating pin protruding outwardly sealed through the wall of the coupling nipple for this purpose. The part of the flow restrictor adjustment protruding outwardly may then be brought into engagement with the coupling element, this occurring, for example, by the coupling nipple element being plugged into the bush element.

More particularly it may be provided for that the coupling element comprises a ring guided in an annular groove, thus assuring a reliable location and guidance of the ring with minor axial clearance. The ring element may be in contact with the sidewall of the annular groove over almost all of its face surface area, as a result of which only minor surface area pressurization occurs.

More particularly the ring may comprise axial full-length depressions for the ratchet teeth of the coupling mating element.

BRIEF DESCRIPTION OF THE DRAWING

Further features, details and benefits read from the claims worded with respect to the contents of the description, from the following description of a preferred embodiment of the invention as well as from the drawing in which:

DETAILED DESCRIPTION

Figure 1:
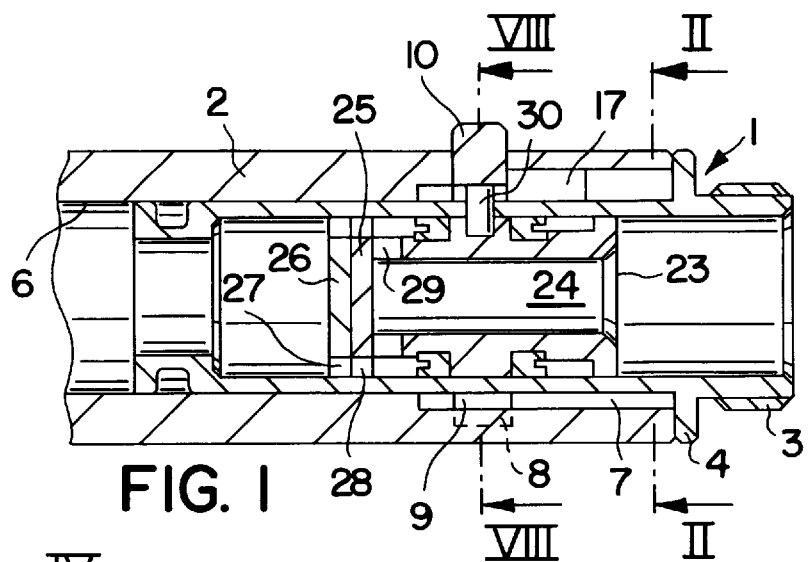
FIG. 1 is a scrap longitudinal section through a coupling means in accordance with the invention in the assembled condition.

FIG. 1 is a longitudinal section through a coupling nipple 1 inserted in and coupled to a coupling bush 2. The coupling nipple 1 is provided at its end, shown on the right in FIG. 1, with a male thread 3 with which it can be screwed to the end of a shower handle, for example.

Adjoining the male thread 3 the coupling nipple 1 comprises a flange 4 oriented radially outwards, this flange 4 adjoining the face surface area 5 of the coupling bush 2 in the coupled condition. The coupling bush 2 may be, for instance, the handle of a hand shower. The coupling bush 2 comprises internally an opening 6 the inner diameter of which over most of its length corresponds to the outer diameter of the coupling nipple 1, as a result of which the coupling nipple 1 is received practically with zero clearance in the coupling bush 2. The internal opening 6 of the coupling bush 2 comprises in the region of its outer end defined by the face surface area 5 several grooves 7 oriented axially as well as an annular groove 8 intersecting the axial grooves on all sides. Inserted in the annular groove 8 is a ring element 9 which can be turned about the longitudinal axis of the coupling bush 2. The ring element 9 has a width corresponding to that of the annular groove 8, as a result of which the ring element 9 is axial guided with zero clearance in the annular groove 8. The ring element 9 comprises at one point an actuator button 10 passing through a slot 11 in the wall of the coupling bush 2, this slot 11 forming an arc. The actuator button 10 is thus accessible from the outer side of the coupling bush 2, as indicated above in FIG. 1, whilst the ring element 9 is arranged accommodated totally within the coupling bush 2. Together with its bearing in the annular groove 8 the ring element 9 forms a coupling element with which the coupling nipple 1 can be coupled to and latched in the coupling bush 2.

Figures 2, 3:
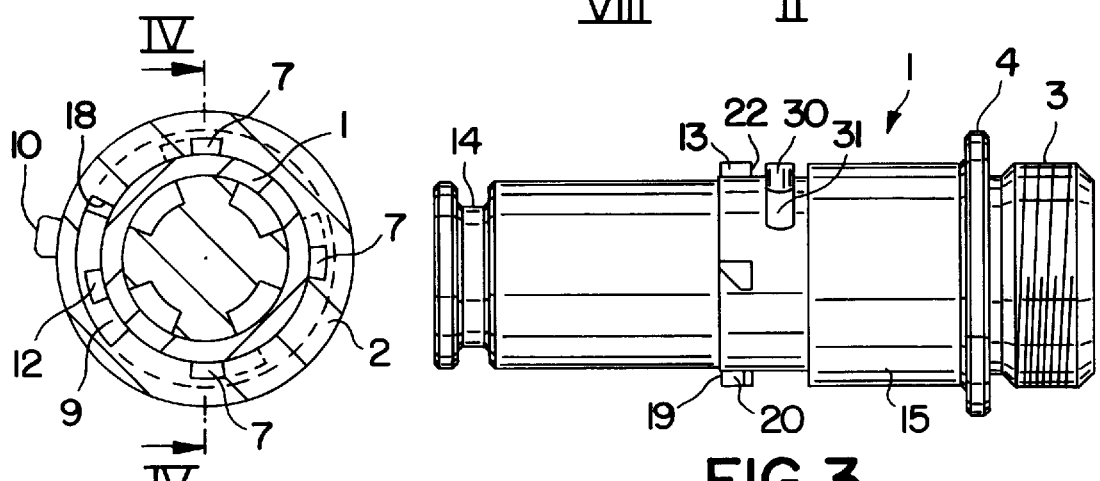
FIG. 2 is a cross section taken along the line II as shown in FIG. 1, rotated by 90° counter clockwise.
FIG. 3 is a corresponding side view of the coupling nipple as shown in FIG. 1.

FIG. 2 shows an angled cross-section along the line II—II as shown in FIG. 1. It is evident that a total of four longitudinal grooves 7 exist in the coupling bush 2 which extend axially and are uniformly distributed about a circumference. One of the longitudinal grooves 7 is covered by the ring element 9, this ring element too, comprising transversely oriented grooves 9 which in the corresponding position of the ring element 9 can be caused to coincide with the longitudinal grooves 7.

Whilst the ring element 9 forms together with its guide 8 the coupling element which can be varied, i.e. turned in the present case, the coupling nipple 1 comprises a coupling mating element formed by the four ratchet teeth 13. The ratchet teeth 13 are positioned and sized corresponding to the longitudinal grooves 7.

In the region of its end facing the interior of the coupling bush 2 the coupling nipple 1 comprises, indicated on the left in FIG. 3, a circumferential annular groove for receiving an O-ring. This O-ring serves to seal off the coupling nipple 1 relative to the coupling bush 2. Roughly in the middle of its elongation the coupling nipple 1 comprises the aforementioned ratchet teeth 13. Adjoining the coupling mating element formed by the ratchet teeth 13, axially spaced away by a certain amount, is a section 15 having a larger diameter serving to guide the coupling element within the coupling bush 2. This portion 15 having the slightly larger diameter extends up to the ring flange 4.

Figure 4:
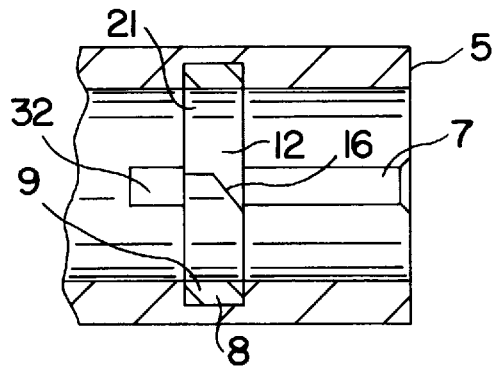
FIG. 4 is a section roughly along the line IV—IV through the coupling bush element.

Referring now to FIG. 4 showing a longitudinal section through the coupling bush 2 roughly along the line IV—IV as shown in FIG. 2, it is evident that the longitudinal grooves 7—of which one only is depicted in FIG. 1 to simplify the illustration—transversing the annular groove 8 receiving the ring element 9 extend beyond the ring element 9 by a certain amount. In this arrangement the length of this rear section 32 of the longitudinal grooves 7 corresponds to at least the axial extent of the ratchet teeth 13.

In the region of their front side facing the outer end of the coupling bush 2 the transverse grooves 12 transversing the ring element 9 comprise a slanting surface area 16.

Figure 5:
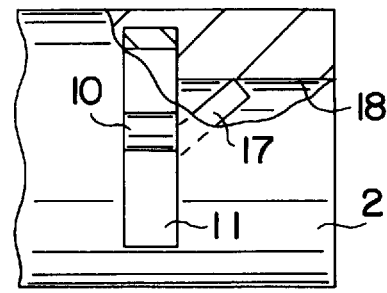
FIG. 5 is a side view of the coupling element as shown in FIG. 4, partly sectioned.

As evident from FIG. 5 the ring element 9 comprises a spring 17 which is downswept on one side. This spring 17 is able to cooperate with the coupling bush 2 by its stop surface area 18. When the ring element 9 is turned further from the position as shown in FIG. 5 with the aid of the actuator button 10, the latter thereby being shifted upwards as shown in FIG. 5, this results in the spring 17 being deformed, as shown by the position in FIG. 7. In this position the return force resulting from deformation of the spring 17 strives to return the ring element 9 to the position as shown in FIGS. 4 and 5.

Figure 7:
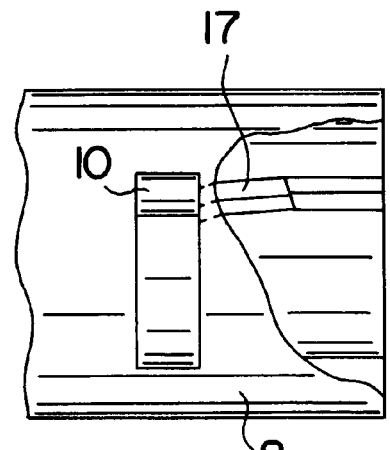
FIG. 7 is a partly scrapped side view of the bush element of the coupling in the position as shown in FIG. 6.
Figure 9:
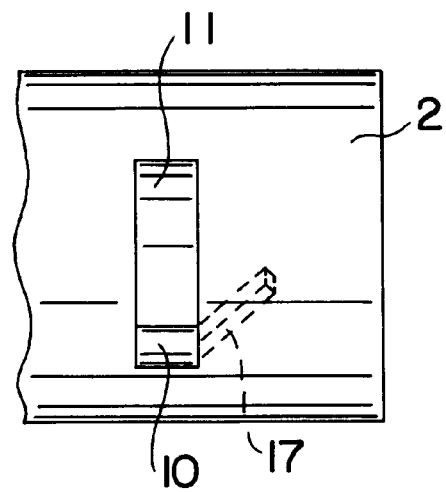
FIG. 9 is a side view of the bush element of the coupling in the position of the coupling element as shown in FIG. 8.

Assuming the position as shown in FIGS. 4 and 5, coupling the coupling necessitates axial insertion of the coupling nipple 1 into the coupling bush 2, whereby the ratchet teeth 13 need to be in line with the longitudinal grooves 7 to enable the coupling nipple to be inserted further. The ratchet teeth 13 slide along the longitudinal grooves 7 until they come up against the slanting surface areas 16 of the transverse grooves 12 of the ring element 9 by their front edges 19 at which likewise a slanting surface area 20 is arranged in each case. On further insertion the slanting surface areas result in the ring element 9 being turned against the return force of the spring 17 until the ratchet teeth 13 pass through the transverse grooves 12 into the rear portion of the longitudinal grooves 7 and located behind the rear edge 21 of the ring element 9. As soon as the rear edges 22 of the ratchet teeth 13 relative to the direction of insertion have passed the rear edge 21 of the ring element 9, the spring 17 again turns the ring element 9 into the latched position as shown in FIG. 4 at which the aforementioned rear edges 22 of the ratchet teeth 13 are retained by the ring element 9. In this position the flange 4 is also in contact with the face surface area 5 of the coupling bush 2, the coupling thus being made and latched. In this position— see FIGS. 4 and 5—the ring element 9 forming the coupling element can now be turned further in the same direction of actuation, corresponding to a downwards movement of the actuator button 10 as shown in FIGS. 5 and 7. This is neither obstructed nor made difficult by the spring 17 since the latter is in contact with the stop surface area 18 only when turning is done in the opposite direction. This maximum extreme position of the coupling element or actuator button 10 is shown in FIG. 9 where the actuator button 10 is in contact with the opposite end of the slot 11 of the coupling bush 2. The position of the spring 17 is indicated by the broken line.

As is particularly evident from FIG. 1 the coupling nipple 1 contains in addition an adjustable flow restrictor 23. The flow restrictor 23 comprises an a variable flow restrictor element 24 which is configured as a rotatable sleeve. The sleeve of the flow restrictor element 24 is open at the water inflow end, this being on the right in FIG. 1. At the opposite end it is closed off by an end wall 25 by which it is in contact with a fixed transverse wall 26 of the coupling nipple 1. The transverse wall 26 comprises several arced ports 27 along its outer circumference.

The end wall 25 of the flow restrictor element 24 likewise comprises along its circumference several arced ports 28. These arced ports 27, 28 extend over an angle of approximately 45°.

As viewed in the direction of flow the sleeve of the flow restrictor element 24 comprises upstream of the end wall 25 several radially oriented ports 29 through which the water is able to flow from the interior of the sleeve outwards and thus to the arced ports 28.

Figure 6:
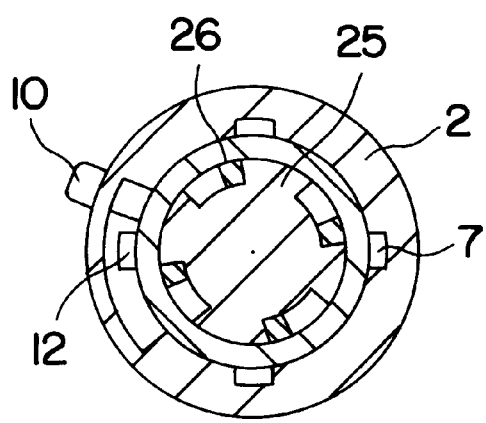
FIG. 6 is a view as shown in FIG. 2 showing the coupling element turned further.

For turning the flow restrictor element 24 circumferentially the flow restrictor element 24 contains a pin 30 which protrudes through a sealed slot 31 on the outer side of the nipple 1, this being particularly evident from FIG. 3 at the top. With the aid of this pin 30 the flow restrictor element 24 can be turned within the coupling nipple 1, the arced ports 27, 28 coinciding, depending on the position of the flow restrictor element 24—see FIG. 2—or partly not coinciding, as shown in FIG. 6. Total coincidence of the arced ports, as shown in FIG. 2, corresponds to a minimum restriction, whilst any turning and thus a reduction in the passage cross-section represents a restriction, see FIG. 6.

Figure 8:
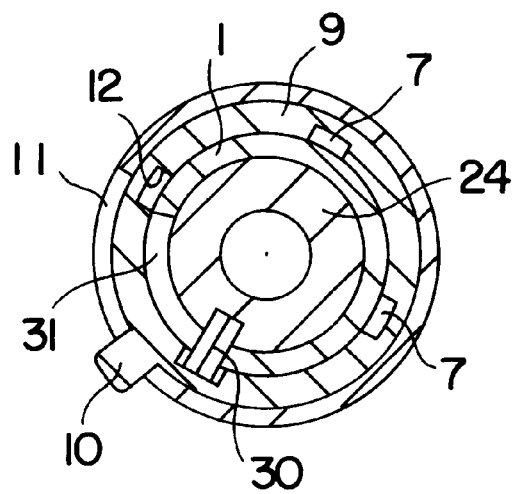
FIG. 8 is a section along the line VIII—VIII through the arrangement as shown in FIG. 1, rotated by 115° counter clockwise.

The ring element 9 serves to actuate the pin 30, the ring element 9 simultaneously forming the coupling. On insertion of the coupling nipple 1 the pin 30 enters the transverse groove 12 of the ring element 9, it being continued to be arranged in the transverse groove 12 axially following total insertion of the coupling nipple 1 and the latching action thereof. This is evident, for example, from FIG. 8 illustrating a section along the line VIII—VIII in FIG. 1. With the aid of the actuating element 10 turning the flow restrictor element 24 can be implemented by producing a turn in the portion in which the ring element 9 latches the ratchet teeth 13. In this arrangement the actuator button 10 is moved, i.e. turned, in the same direction as in the latching action. By turning the restrictor clockwise or counter-clockwise the user is able to vary the restriction to be more or less. As soon the portion is attained in which a release action could take place the user perceives this by the increasing resistance due to deformation of the spring 17.

The invention thus provides a coupling means which in principle consists of three parts, namely a coupling nipple 1, a coupling bush 2 and a rotatable coupling element formed by the ring element 9, The coupling sleeve 2 is in one-piece, the coupling nipple 1 likewise forming one-piece except for the flow restrictor means 23 and the coupling element, namely the ring element 9 together with the actuator button 10, are likewise in one piece. As a result of this a coupling means is provided having a simple and thus rugged configuration.

With the aid of this coupling means the additional element, this being the flow restrictor means 23 in the example described above, can be additionally actuated. It will, of course, be appreciated that in this way, namely by turning the coupling element in the coupled portion, any other additional means, for instance a valve for more or less opening a soap dispenser or the like, may also be actuated.

What is claimed is:

1. A coupling means for connecting two tubular elements, comprising:
a nipple element couplable to one of the two tubular elements,
a bush element having an internal opening configured to receive the nipple element, the bush element being couplable respectively to the other tubular element,
a coupling element coupled to one of said nipple and bush elements, the nipple element being inserted into the bush element, the coupling element preventing uncoupling of the nipple and bush elements by cooperation with a coupling mating element at the other of said nipple element and bush elements, the coupling element being movable into a release position against an urging force, wherein the coupling element has a direction of actuation and latched position in which said coupling element can be further adjusted in the direction of actuation.

2. The coupling means as set forth in claim 1, wherein said nipple element and bush element have a common axis and said coupling element is arranged to rotate about the common axis of said nipple element and bush element.

3. The coupling means as set forth in claim 1, wherein said nipple element is introduced linearly into said bush element.

4. The coupling means as set forth in claim 1, wherein said coupling element is spring loaded.

5. The coupling means as set forth in claim 1, wherein said coupling mating element comprises several ratchet teeth fixedly arranged, circumferentially on one of said nipple element and said bush element.

6. The coupling means as set forth in claim 5, wherein the other of one of said nipple element and said bush element has guiding grooves for receiving said ratchet teeth.

7. The coupling means as set forth in claim 1, wherein at least one of said coupling element and said coupling mating element is configured such that on introducing said nipple into said bush element said coupling element is moved into the release position.

8. The coupling means as set forth in claim 1, wherein said coupling element is accessible only with the aid of an actuating element.

9. The coupling means as set forth in claim 1, wherein said coupling element is in connection with a flow restrictor means coupled to at least one of said nipple element and said coupling bush element.

10. The coupling means as set forth in claim 9, wherein said coupling means has a latched position and said flow restrictor means is adjustable with the aid of said coupling element when said coupling means is in the latched position.

11. The coupling means as set forth in claim 1, wherein said coupling element comprises a ring element guided in an annular groove.

12. The coupling means as set forth in claim 11, wherein said ring element has axial full-length transverse grooves for said coupling mating element.

13. The coupling means as set forth in claim 1, wherein said coupling element is in connection with a flow restrictor means which is connectable on insertion of said nipple element into said bush element.

14. The coupling means as set forth in claim 13, wherein said coupling means has a latched position and said flow restrictor means is adjustable with the aid of said coupling element when said coupling means is in the latched position.

* * * * *